(12) United States Patent
Park et al.

(10) Patent No.: US 9,661,372 B2
(45) Date of Patent: May 23, 2017

(54) DISPLAY APPARATUS AND CONTROL METHOD THEREOF

(71) Applicant: SAMSUNG ELECTRONICS CO., LTD., Suwon-si (KR)

(72) Inventors: Sung-woo Park, Seoul (KR); Oh-yun Kwon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 320 days.

(21) Appl. No.: 14/311,551

(22) Filed: Jun. 23, 2014

(65) Prior Publication Data

US 2015/0095781 A1   Apr. 2, 2015

(30) Foreign Application Priority Data

Sep. 30, 2013   (KR) .................. 10-2013-0116276

(51) Int. Cl.
| | | |
|---|---|---|
| *G06F 3/048* | (2013.01) | |
| *H04N 21/422* | (2011.01) | |
| *H04N 21/43* | (2011.01) | |
| *H04N 21/4402* | (2011.01) | |
| *H04N 21/4728* | (2011.01) | |
| *H04N 21/488* | (2011.01) | |

(52) U.S. Cl.
CPC ....... *H04N 21/422* (2013.01); *H04N 21/4307* (2013.01); *H04N 21/440236* (2013.01); *H04N 21/440245* (2013.01); *H04N 21/4728* (2013.01); *H04N 21/4884* (2013.01)

(58) Field of Classification Search
CPC ....... H04N 21/4884; H04N 1/32614–1/32635; H04N 13/0022; H04N 21/235–21/4382; H04N 2201/0082; G06F 3/0482–3/04886; G06F 9/4446; G06F 11/073–11/202; G06F 17/30094–17/30265
See application file for complete search history.

(56) References Cited

U.S. PATENT DOCUMENTS

| | | | |
|---|---|---|---|
| 8,320,674 B2 | 11/2012 | Guillou et al. | |
| 2006/0044469 A1* | 3/2006 | Kim | H04N 5/04 348/515 |
| 2007/0085928 A1* | 4/2007 | Sloot | H04N 5/44513 348/468 |
| 2008/0109528 A1* | 5/2008 | Knight | G06F 8/71 709/217 |
| 2008/0233980 A1* | 9/2008 | Englund | G06F 17/289 455/466 |

(Continued)

*Primary Examiner* — Claudia Dragoescu
(74) *Attorney, Agent, or Firm* — Sughrue Mion, PLLC

(57) ABSTRACT

An apparatus includes: a communication interface configured to communicate with an external device which is configured to provide video data; a user interface configured to control based on a user input; a processor configured to process the video data, which is received in the communication interface, to be displayed as an image on the display; a controller configured to perform control to extract a text for a plurality of respective processing regions which are set up to have a plurality of same coordinates as a designated region with regard to each video frame based on the processed video data after a point of time in response to a partial region being designated by the user interface within a displayed video frame on the display, and apply a preset process to the extracted text in sync with each video frame.

12 Claims, 10 Drawing Sheets

(56) References Cited

U.S. PATENT DOCUMENTS

| | | | |
|---|---|---|---|
| 2009/0002558 A1* | 1/2009 | Lidberg | H04N 5/144 348/607 |
| 2011/0123115 A1* | 5/2011 | Lee | G06K 9/036 382/185 |
| 2013/0205248 A1* | 8/2013 | Moon | G06F 3/04815 715/782 |
| 2014/0258880 A1* | 9/2014 | Holm | G06F 3/017 715/748 |

* cited by examiner

DISPLAY APPARATUS AND CONTROL METHOD THEREOF

CROSS-REFERENCE TO RELATED APPLICATION

This application claims priority from Korean Patent Application No. 10-2013-0116276, filed on Sep. 30, 2013 in the Korean Intellectual Property Office, the disclosure of which is incorporated by reference in its entirety.

BACKGROUND

Field

Apparatuses and methods consistent with the exemplary embodiments relate to a display apparatus for processing the video data received from an external device and displaying an image and a control method thereof. In particular, exemplary embodiments relate to a display apparatus and a control method thereof, in which a text such as a subtitle or a similar text contained in an image is processed while displaying the video data reproduced and input from an external device as the corresponding image.

Description of the Related Art

A related art image processing apparatus for processing video data to be displayed as an image is classified into a first type that includes a display panel and displays the processed video signal by itself, and a second type that includes no display panel and outputs the processed video signal to another device. In particular, the first type is called a display apparatus and may include a television as an example.

The video data to be processed for the display apparatus may be stored in the display apparatus or transmitted to the display apparatus from an exterior device. As an example of transmitting the video data from the exterior device to the display apparatus, there may be a case where the display apparatus is locally connected to an external device such as a digital versatile disc (DVD)/Blu-ray player and the video data reproduced in the external device is transmitted to the display apparatus.

A text subtitle may be displayed within a scene of an image displayed on the display apparatus. The text subtitle is not transmitted to the display apparatus as additional information separate from the image, but forms a data portion of the image itself. In this case, the subtitle is not text data but video data. Thus, the subtitle is difficult to process when a user wants to apply a text-related process to the subtitle separately from the image.

With recent trends in information technology (IT) and electronics, a lot of additional services which use moving images have been offered due to an increase in communication bandwidth and communication speed. Therefore, demands for various user services which are convenient to a user have increased with regard to the moving images. In this regard, since an image includes a subtitle (i.e., the text data related to the subtitle is not separated from the subtitle) transmitted to the display apparatus, if the subtitle is extracted and processed separately from the image, it may improve user convenience through an additional user service.

SUMMARY

According to an aspect of an exemplary embodiment there is provided a display apparatus which includes: a display; a communication interface configured to communicate with an external device which is configured to provide video data; a user interface configured to control based on a user input; a processor configured to process the video data, which is received in the communication interface, to be displayed as an image on the display; and a controller configured to perform control to extract a text for a plurality of processing regions which are set up to have a plurality of same coordinates as a designated region with regard to each video frame based on the processed video data after a point of time in response to a partial region being designated by the user interface within a displayed video frame on the display, and apply a preset process to the extracted text in sync with each video frame.

The controller may be further configured to control the processor to apply optical character recognition (OCR) to the processing regions and extract a plurality of texts from the respective processing regions.

The user interface may include a motion sensor configured to sense a user motion, and the controller may be further configured to designate the partial region in accordance with the sensed user motion sensed by the motion sensor.

The controller may be further configured to designate the partial region in accordance with a cursor movement through the user interface.

The preset process may include a translation service for the text, and the controller may be further configured to transmit the text to a server and may receive and display a translation of the text from the server.

The controller may be further configured to display a processing region to be overlaid with the translation in response to the translation being displayed in the video frame.

In response to determining that a difference between a first area value of the partial region first designated by the user interface and a second area value occupied with the text within a processing region is greater than a preset threshold, the controller may be further configured to adjust an area of the processing region so that a difference between the first area value and the second area value can be smaller than the preset threshold.

The controller may be further configured to delay a point of time for displaying the video frame so as to synchronize the text processed by the preset process with the video frame, based on a time taken in extracting the text and performing the preset process with regard to a processing region of one video frame.

In response to a first text, a second text, and a third text extracted from a first video frame, a second video frame, and a third video frame, respectively, which are sequenced in time, the controller may be further configured to determine that an error occurs while the second text is extracted from the second video frame, in response to the first text and the third text having the same contents and the second text being different in contents from the first text and the third text.

In response to determining that the second text has the error, the controller may be further configured to process the second text to have the same contents as those of the first text and the third text.

According to another aspect of an exemplary embodiment, there is provided a method of controlling a display apparatus, the method includes: receiving video data from an external device; displaying the video data as an image; receiving input for designating a partial region by a user within a video frame of the displayed image at a point of time; performing control to extract a text for a plurality of respective processing regions which are set up to have a plurality of same coordinates as those of the designated region with regard to each video frame based on a processed video data after a point of time; and applying a preset process to the extracted text in sync with each video frame.

The performing control to extract the text for the respective processing regions may include applying optical character recognition (OCR) to the processing regions and extracting a plurality of texts from the respective processing regions The receiving the input for designating the partial region by a user may include designating the partial region in accordance with a sensed user motion sensed by a motion sensor of the display apparatus.

The receiving the input for designating the partial region by a user may include designating the partial region in accordance with a cursor movement through a user interface of the display apparatus.

The preset process may include a translation service for the text, and the applying the preset process to the extracted text in sync with each video frame may include: transmitting the text to a server; and receiving and displaying a translation of the text from the server.

The receiving and displaying the translation of the text from the server may include displaying a processing region to be overlaid with the translation.

The method may further include in response to determining that a difference between a first area value of the partial region first designated by the user and a second area value occupied with the text within a processing region is greater than a preset threshold, adjusting an area of the processing region so that a difference between the first area value and the second area value can be smaller than the preset threshold.

The applying the preset process to the extracted text in sync with each video frame may include delaying a point of time for displaying the video frame so as to synchronize the text processed by the preset process with the video frame, based on a time taken in extracting the text and performing the preset process with regard to a processing region of one video frame.

The method may further include: in response to a first text, a second text, and a third text extracted from a first video frame, a second video frame, and a third video frame, respectively, which are sequenced in time, determining that an error occurs while the second text is extracted from the second video frame, in response to the first text and the third text having the same contents and the second text being different in contents from the first text and the third text.

The determining that an error occurs while the second text is extracted from the second video frame may include processing the second text to have the same contents as those of the first text and the third text.

According to another aspect of an exemplary embodiment, a method of controlling a display apparatus may be provided including: pausing a displayed image in response to an event occurring which designates a processing region; storing position information of the processing region in response to a plurality of coordinates being input and the delayed image being paused; resuming the displayed image in response to the stored position information; extracting a text from the processing region; applying a preset process to the extracted text; and displaying the processed texts.

The displaying the processed text may occur in sync with a video frame which includes the displayed image.

The preset process may include a translation service for the text.

The displaying the processed text may further include: displaying the processing region overlaid with the translation.

The apparatus may further include the display.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF THE EXEMPLARY EMBODIMENTS

Figure 1:
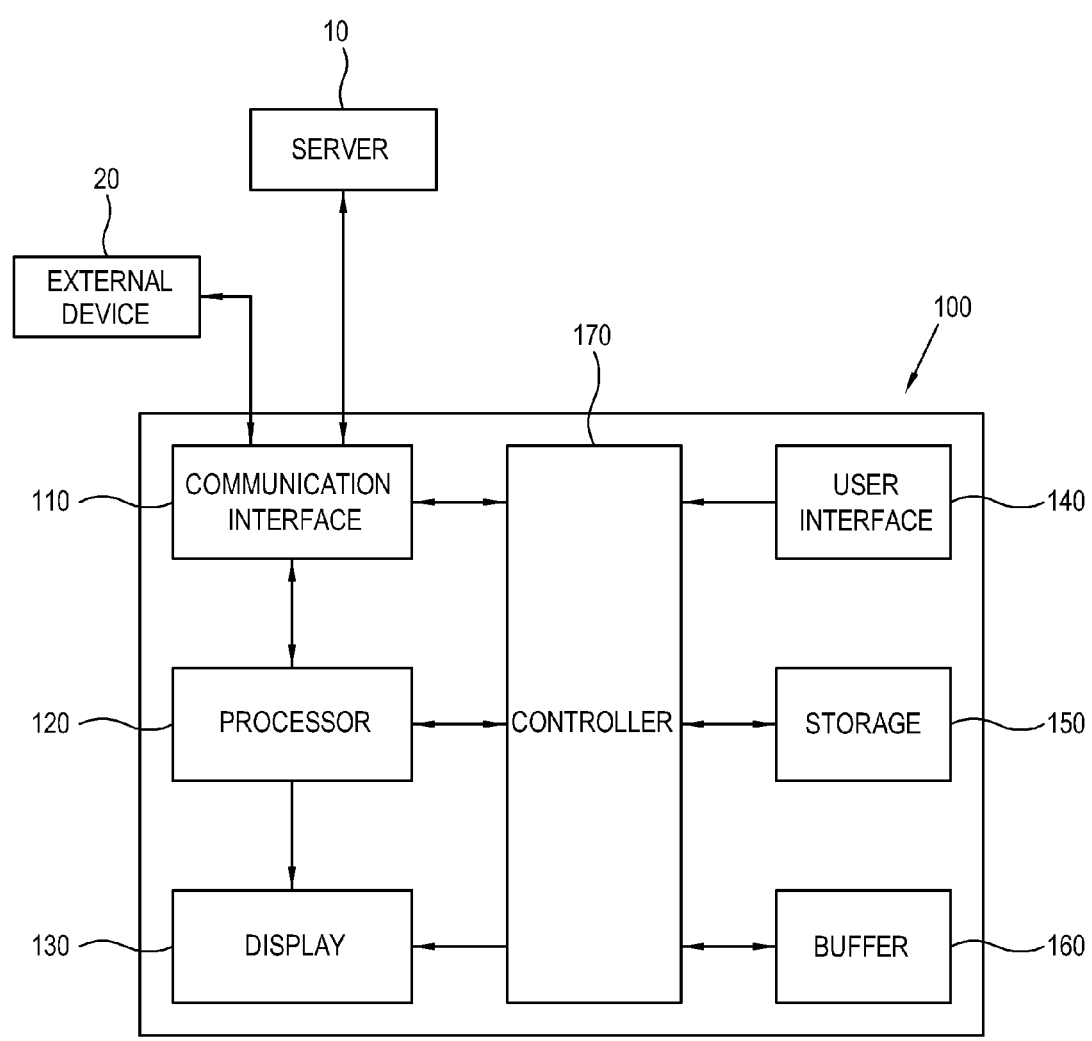
FIG. 1 is a block diagram of a display apparatus involved in a system according to a first exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, but this does not mean that the omitted parts are unnecessary for realization of apparatuses or systems to which the exemplary embodiments are applied. Like reference numerals refer to like elements throughout.

FIG. 1 is a block diagram of a display apparatus 100 involved in a system according to a first exemplary embodiment. The display apparatus 100 may be achieved by any electronic device that can process and display an image. In this exemplary embodiment, a television (TV) is employed as the display apparatus 100, but the display apparatus is not limited thereto. Alternatively, a portable multimedia reproducer, a mobile phone, etc., may be used.

As shown in FIG. 1, the display apparatus 100 in this exemplary embodiment is connected to an external server or an external device 20 through a network or a local connection. In the case where the external device 20 is an image supply source, the display apparatus 100 may receive video data from the external device 20. In this exemplary embodiment, the external device 20 is an image reproducer which is locally connected to the display apparatus 100, and which transmits the reproduced video data reproduced by itself to the display apparatus 100.

The display apparatus 100 includes a communication interface 110 which performs communication with an exterior device to transmit or receive data or a signal, a processor 120 which processes data received in the communication interface 110 in accordance with preset processes, a display 130 which displays video data as an image if data processed in the processor 120 is the video data, a user interface 140 which is for a user input, a storage 150 which stores data of information, a buffer 160 which temporarily stores the data or the information to be processed, and a controller 170 which controls general operations of the display apparatus 100.

The communication interface 110 transmits or receives data so that interactive communication can be performed between the display apparatus 100 and the server 10 or the external device 20. The communication interface 110 accesses the server 10 or the external device 20 through wide area networks, local area networks, or local connections in accordance with preset communication protocols.

The communication interface 110 may be achieved by connection ports according to devices or an assembly of connection modules, in which the protocol for connection or the external device 20 for connection is not limited to one kind or type. The communication interface 110 may be a built-in device of the display apparatus 100, or the entire or a part thereof may be added to the display apparatus 100 in the form of an add-on or dongle type.

The communication interface 110 transmits or receives a signal in accordance with protocols designated according to the connected devices, in which the signals can be transmitted or received based on individual connection protocols with regard to the connected devices. In the case of video data, the communication interface 110 may transmit or receive the signal bases on various standards such as a radio frequency (RF) signal, composite/component video, super video, Syndicat des Constructeurs des Appareils Radiorécepteurs et Téléviseurs (SCART), high definition multimedia interface (HDMI), display port, unified display interface (UDI), wireless HD, etc.

The processor 120 performs various processes with regard to data or a signal received in the communication interface 110. If the communication interface 110 receives the video data, the processor 120 applies an imaging process to the video data and the video data processed by this process is output the display 130. Therefore, the display 130 may display an image based on the corresponding video data. If the signal received in the communication interface 110 is a broadcasting signal, the processor 120 extracts video, audio, and appended data from the broadcasting signal tuned to a certain channel, and adjusts an image to have a preset resolution, so that the image can be displayed on the display 130.

There is no limit to the kind of imaging processes to be performed by the processor 120. For example, image processes to be performed may include decoding corresponding to an image format of the video data, de-interlacing for converting the video data from an interlace type into a progressive type, scaling for adjusting the video data to have a preset resolution, noise reduction for improving image qualities, detail enhancement, frame refresh rate conversion, etc.

The processor 120 may perform various processes in accordance with the kinds and attributes of data. Thus, the process to be implemented in the processor 120 is not limited to the imaging process. Also, the data processed in the processor 120 is not limited to only data received in the communication interface 110. For example, the processor 120 also processes a user utterance through a preset voicing process when the user interface 140 receives the corresponding utterance, and processes a sensing result through a preset gesture process when the user interface 140 senses a user gesture.

The processor 120 may be achieved by an image processing board (not shown) on a system-on-chip where various functions are integrated or an individual chip-set capable of independently performing each process is mounted on a printed circuit board. The processor 120 may be built-in the display apparatus 100.

The display 130 displays the video signal or the video data processed by the processor 120 as an image. The display 130 may be achieved by various display types such as liquid crystal, plasma, a light-emitting diode, an organic light-diode, a surface-conduction electron-emitter, a carbon nanotube and a nano-crystal. However, the display is not limited thereto.

The display 130 may additionally include an appended element in accordance with the display types. For example, in the case of the liquid crystal type, the display 130 may include a liquid crystal display (LCD) panel (not shown), a backlight unit (not shown) which emits light to the LCD panel, a panel driving substrate (not shown) which drives the panel (not shown), etc.

The user interface 140 transmits various preset control commands or information to the controller 170 in accordance with a user control or input. The user interface 140 generates information corresponding to various events that occur in accordance with a user intention and transmits it to the controller 170. The events that occur by a user may have various forms, and may, for example, include a user control, utterance, gesture, etc.

In accordance with methods by which a user inputs information, the user interface 140 is provided to detect the information input by the corresponding method. For example, the user interface 140 may be achieved by a remote controller remotely separated from the display apparatus 100, a menu key or an input panel provided outside the display apparatus 100, a touch screen provided in the display 130, a microphone for receiving a user utterance, a camera or motion sensor for sensing a user motion, etc.

The storage 150 stores various data under control of the controller 170. The storage 150 is achieved by a nonvolatile memory such as a flash memory, a hard disk drive, etc., so as to retain data regardless of power on/off of the system. The storage 150 is accessed by the controller 170 so that previously stored data can be read, recorded, modified, deleted, updated, and so on.

The buffer 160 temporarily stores data scheduled to be processed or being processed by the processor 120 and the controller 170. For example, there is a need for temporarily storing the video data received in the communication interface 110 from the external device 20 because the video data has to be temporarily stored before or while being processed by the processor 120. To achieve this temporary storage, the buffer 160 is provided. The buffer 160 only has to retain data while the display apparatus 100 operates. Therefore, the buffer 160 is achieved by a volatile memory, since a nonvolatile memory is not required (wherein the storage 150 requires a nonvolatile memory).

The controller 170 is achieved by a central processing unit (CPU), and controls operations of general elements of the display apparatus 100, such as the processor 120, in response to occurrence of a predetermined event. For example, if the communication interface 110 receives the video data from the external device 20, the controller 170 controls the processor 120 to process the video data to be displayed as an image on the display 130. Also, the controller 170 controls the elements such as the processor 120 to implement a preset operation corresponding to a user input event when the corresponding event occurs through the user interface 140.

There are two cases where the text subtitle is shown within an image displayed on the display apparatus 100.

One case is where the display apparatus 100 receives video data and the text data from the external device 20. In this case, the display apparatus 100 not only displays an image based on the video data, but also displays the text data in sync with the image in such a manner that the image is overlaid with the text data. Thus, the display apparatus displays both the image and the subtitle.

The other case is where the external device 20 does not offer the text data to the display apparatus 100 and the video data involves the contents of the subtitle. In this case, the display apparatus 100 processes only the video data and displays it as an image, since there is no separately received text data. In this case, the image is not overlaid with the text data on the display apparatus 100, and the text data is displayed as a part of the image.

Regarding the two cases where the subtitle is displayed, suppose that the subtitle displayed on the image is foreign to a user language. For example, an English subtitle may be displayed while a Korean user (who is not good at English) views. In this case, a user may want to view a Korean subtitle translated from the English subtitle, instead of the original English subtitle.

If the text data for the subtitle is separately offered, the display apparatus 100 processes the text data to be translated and displays the subtitle based on the translated text data.

In the other case of the two cases where the subtitle is displayed, if the text data is not separately offered and the subtitle is involved in the video data, the display apparatus 100 cannot process the contents of the subtitle to be translated. Processing of the contents of the subtitle cannot occur because the subtitle is part of the video data (and not a separate text data).

Therefore, to process the subtitle to be translated in the other case, the display apparatus 100 applies an optical character reading/recognition (OCR) process to a region occupied with a subtitle within a video frame.

Figure 2:
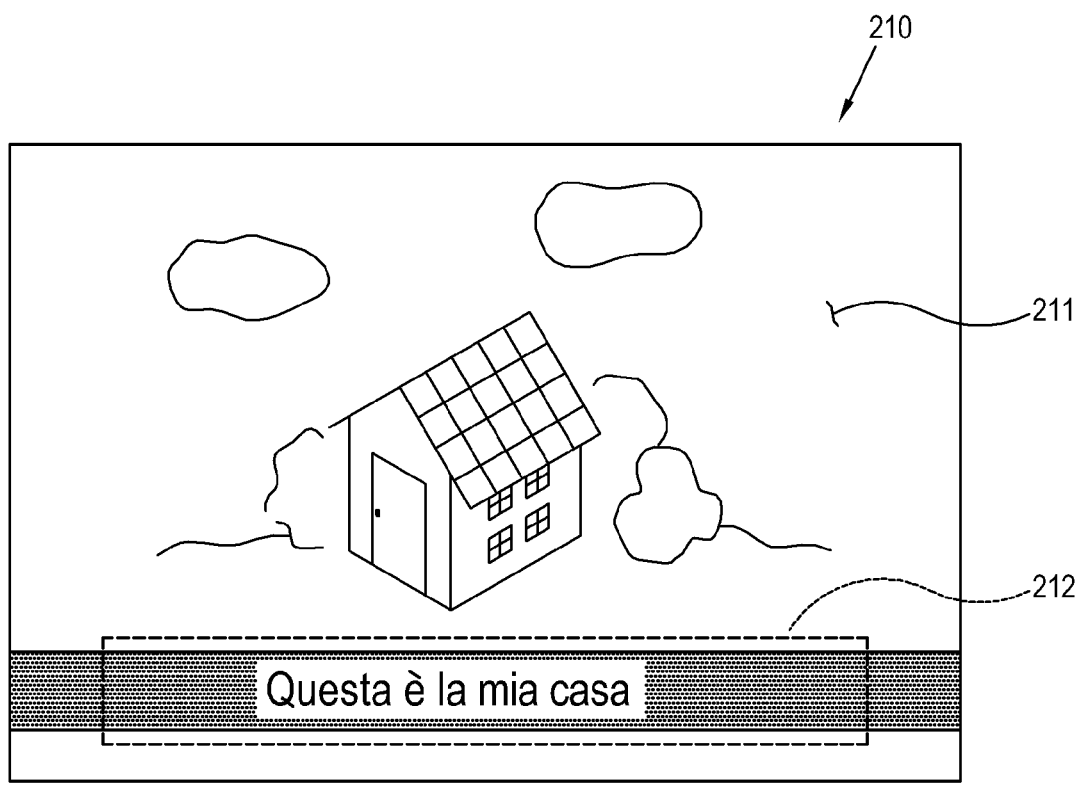
FIG. 2 shows an example of a video frame displayed on the display apparatus of FIG. 1.

FIG. 2 shows an example of a video frame 210 displayed on the display apparatus of FIG. 1.

As shown in FIG. 2, the display apparatus 100 displays an image based on video data received from the external device 20. In a case where the video data involves the content of the subtitle, a video frame 210 of an image according to this embodiment includes an image region 211 where the image is displayed, and a subtitle region 212 where a subtitle is displayed.

While the display apparatus 100 displays an image as time goes by, the position of the subtitle region 212 is set up in a specific position within the video frame 210. The subtitle region 212 is in a specific position because the subtitle region has to be placed in front of the image region 211 without interfering with the image region 211 (if possible). In a related art, the subtitle region 212 is placed in lower or upper edges of the image region 211.

If a sentence displayed in the subtitle region 212 is foreign to a user language, a user may want to view a translation of the sentence displayed on the subtitle region 212. Therefore, the display apparatus 100 applies the OCR process to the video frame 210 and extracts the text from the subtitle region 212. Thus, the extracted text is processed for translation.

The subtitle region 212 and the image region 211 are divided in this exemplary embodiment, i.e., both regions 211 and 212 constitute an image forming the video frame 210. However, in a related art, the display apparatus 100 cannot distinguish the image region 211 and the subtitle region 212 within the video frame 210. Thus, in the related art, the OCR process is applied to the entire video frame 210.

However, the OCR process involves a scanning process with regard to respective pixels of a region to be processed. Thus, the time taken in the OCR process and system load of the display apparatus 100 are increased as the area of the region to be processed becomes larger. Also, if the time taken in the OCR process is increased, the amount of video data to be stored in the buffer 160 is increased. Therefore a storage amount of the buffer 160 is increased.

Also, due to the characteristics of the OCR process, if the area of the region to be processed is increased, the accuracy of the text is deteriorated when the text is extracted from the region to be processed.

In other words, in order to decrease the time taken in the OCR process, reduce the system load, and improve the accuracy of the extracted text, the subtitle region 212 has to be specified on the video frame 210. Then, the OCR process has to be applied to only the specified subtitle region 212.

However, the position of the subtitle region 212 within the video frame 210 may be set to one position with respect to one video content, and may be varied depending on a plurality of video contents. For example, the position of the subtitle region 212 in a predetermined first video content is placed at the lower edge of the video frame 210 in the entire first video contents, but the position of the subtitle region 212 in a second video content may be placed at an upper edge of the video frame 210. Therefore, a problem may arise if the position of the subtitle region 212 for processing is fixed by the display apparatus 100.

Accordingly, this exemplary embodiment proposes the following method to overcome the varied position of the subtitle region 212.

Figure 3:
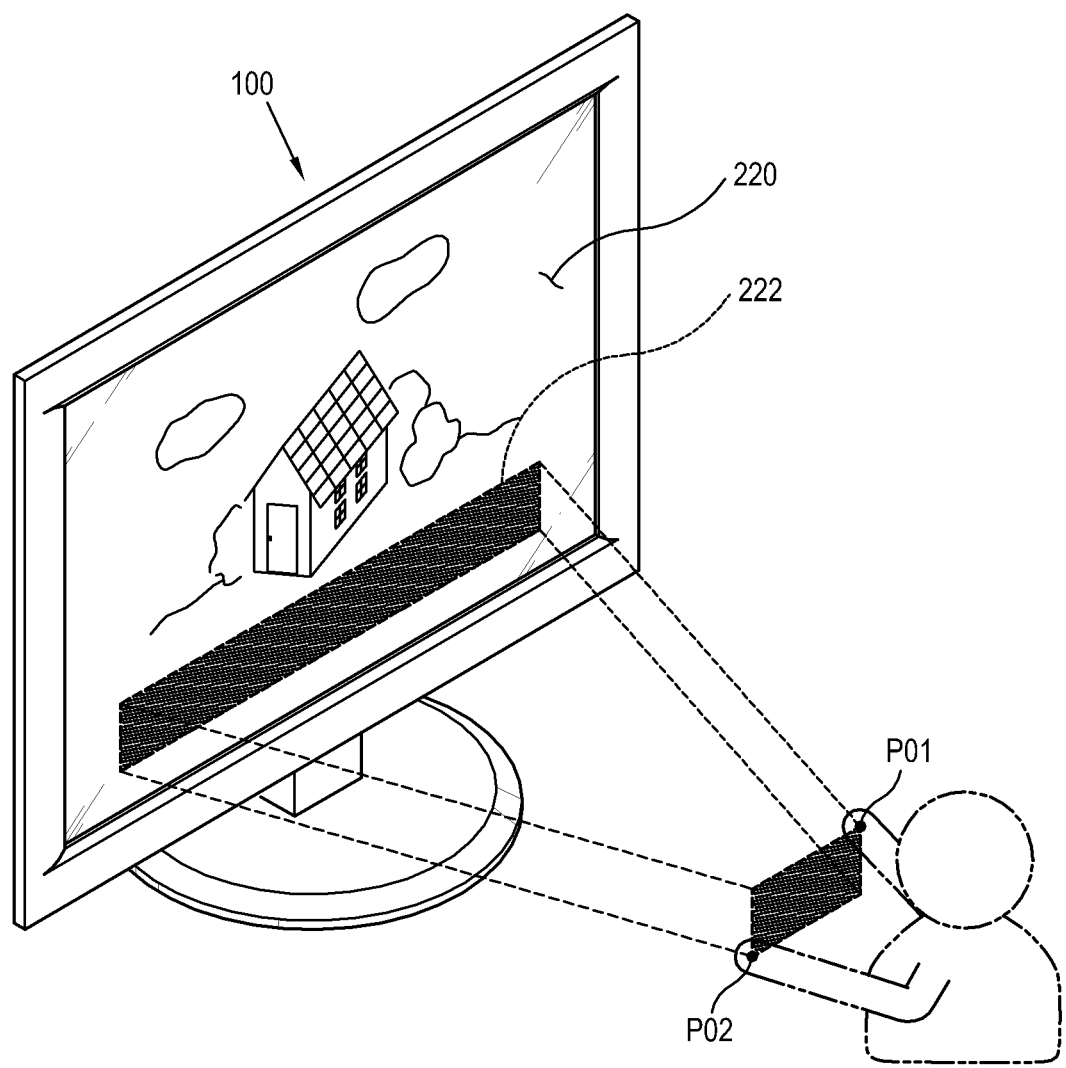
FIG. 3 shows an example of a method of designating an optical character recognition (OCR) processing region in the video frame displayed on the display apparatus of FIG. 1.

FIG. 3 shows an example of a method of designating an optical character recognition (OCR) processing region 222 in the video frame 220.

As shown in FIG. 3, if predetermined processing region 222 is designated by a user within the video frame 220 displayed on the display 130 at a first point of time, the display apparatus 100 designates respective regions, which have the same coordinates as this designated region with regard to respective video frames based on the video data processed after the first point of time, as the processing region, and applies the OCR process to each processing region.

The display apparatus 100 performs the preset process with regard to the text extracted by the OCR process from the processing region 222 of each video frame 220, and displays the processed text in sync with each video frame 220.

Further, while an image is displayed in the display apparatus 100, a user may set up the processing region 222 within the video frame 220 in a state that the corresponding image is paused.

The processing region 222 within the video frame 220 may be set up by any user input through the user interface 140 (refer to 'user interface 140' in FIG. 1). For example, if a user designates predetermined points P01 and P02 within respective spaces by both hands, the display apparatus 100 derives a spatial rectangle having points P01 and P02 as vertexes, and sets up the processing region 222 within the video frame 220 in accordance with the derived rectangle. In this case, the user interface 140 includes a motion sensor or a camera to detect a hand motion of a user within the space.

Also, if the user interface 140 includes a remote controller, a user uses the remote controller to move a cursor (not shown) on the video frame 220, thereby setting up the processing region 222.

Thus, if the processing region 222 is set up within the video frame 220 at the first point of time, the display apparatus 100 memorizes the coordinates of the processing region 222. The display apparatus 100 sets up the processing region 222 at the same position based on the memorized coordinates, with regard to each video frame 220 of the image processed after the first point of time. In other words, the display apparatus 100 sets up each processing region 222 at the position of the same coordinates within each video frame 220 after the first point of time.

The display apparatus 100 applies the OCR process to each processing region 222, and extracts the text from the corresponding processing region 222. The extracted text may undergo various processes. For example, the display apparatus 100 may translate the extracted text into another language and display it on the video frame 220.

Figure 4:
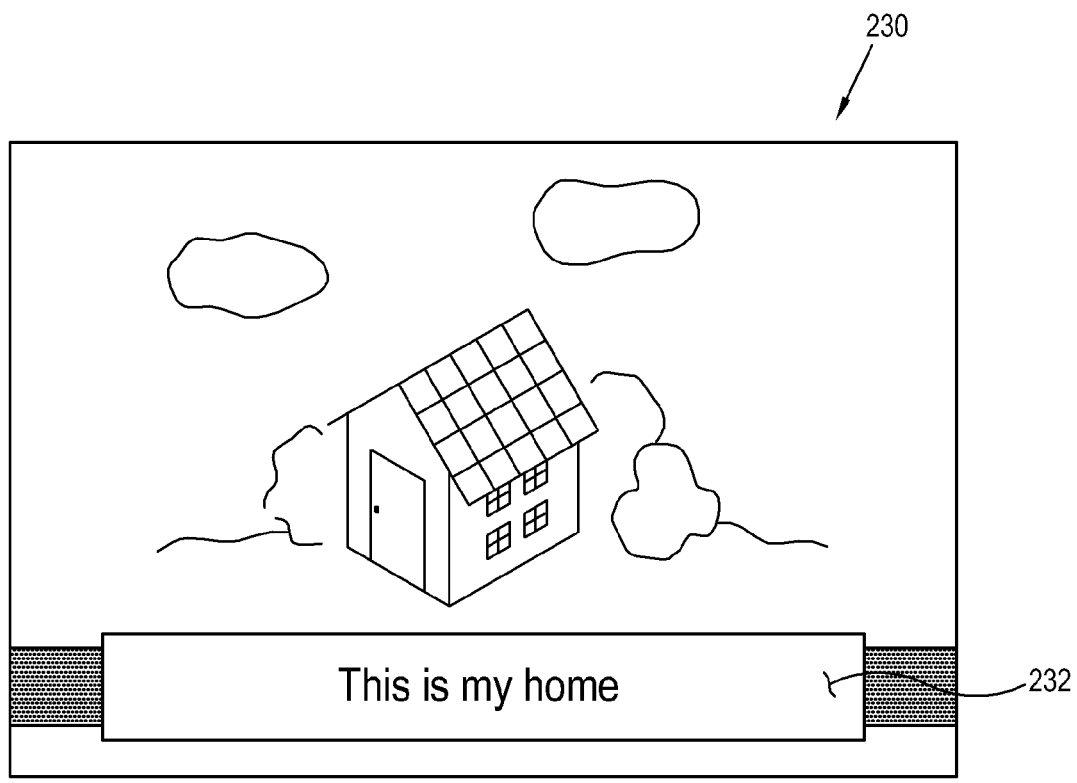
FIG. 4 shows an example that a translation of an extracted text is displayed on the video frame, in the display apparatus of FIG. 1.

FIG. 4 shows an example of a translation of an extracted text displayed on the video frame 230.

As shown in FIG. 4, if a text extracting process is applied to a certain region of the video frame 230, and the text is extracted from the corresponding region, the display apparatus 100 carries out translation of the extracted text.

In accordance with the kinds of process with regard to the text, the corresponding process may be performed by the display apparatus 100 or by the server 10. If the process is simple and lays a small button on the display apparatus 100, the display apparatus 100 may perform the corresponding process. However, if the process is a high-level analysis operation such as the translation, it is more efficient that the process is performed by an external server 10 than that the process is directly performed by the display apparatus 100.

The display apparatus 100 sends the extracted text to the server 10, and requests the extracted text to be translated. The server 10 returns a translation of the corresponding text to the display apparatus 100.

The display apparatus 100 displays the video frame 230 to be overlaid with the translation 232 received from the server 10. The position of the translation 232 within the video frame 230 may be different from the processing region for extracting the text, or may be overlaid on the corresponding processing region.

In one video content, the position of the subtitle is generally defined within the video frame. Thus if a user designates a certain region (as described above), the subtitle content of all the video frames within the video contents may be processed.

Meanwhile, the accuracy of the OCR process increases as the processing region to be processed becomes smaller. As described in the foregoing embodiments, if the processing region designated by a user is called the first processing region, the first processing region designated by the user may be excessively large as compared with the area actually occupied with each video frame.

If the first processing region designated by the user is excessively large as compared to the area actually occupied with the text, it is possible to improve the accuracy of the OCR process by reducing the area of the first processing region.

Figure 5:
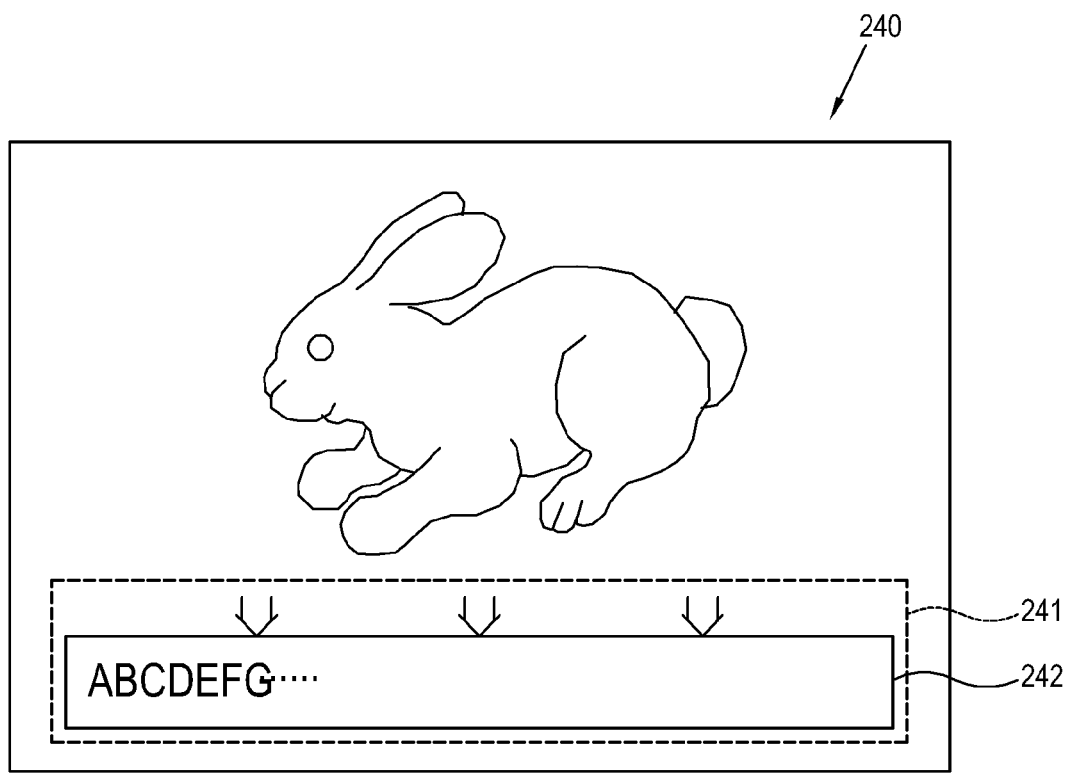
FIG. 5 shows an example where a first processing region set up at first is adjusted by a user according to a second exemplary embodiment.

FIG. 5 shows an example where a first processing region 241 is adjusted by a user according to a second exemplary embodiment.

As shown in FIG. 5, if the first processing region 241 is designated at the first point of time when the video content is reproduced and displayed, the display apparatus 100 records the coordinates and area of the first processing region 241 within the video frame 240 and sets up the processing region having the same coordinates and area as the first processing region 241 in each video frame 240 after the first point of time.

The display apparatus 100 samples processing regions according to respective points of time after the first point of time, extracts the text from the sampled processing regions, and calculates the area occupied with the text within each processing region.

For example, if there are five samples, let the area of the first processing region 241 be M1; an area occupied with the text within the processing region at a second point of time be M2; an area occupied with the text within the processing region at a third point of time be M3; an area occupied with the text within the processing region at a fourth point of time be M4; an area occupied with the test within the processing region at the fifth point of time be M5; and an area occupied with the text within the processing region at a sixth point of time be M6.

The display apparatus 100 determines whether the greatest one among M2, M3, M4, M5 and M6 is smaller than M1 and a difference therebetween is smaller than a preset threshold V1. For example, if the greatest one among M2, M3, M4, M5 and M6 is M3, 'M1−M3<V1' shows that the area of the first processing region 241 is appropriate. In this case, there is no need of adjusting the first processing region 241.

Meanwhile, if the greatest one among M2, M3, M4, M5 and M6 is smaller than M1 and a difference therebetween is greater than the preset threshold V1, there is a need of adjusting the first processing region 241. For example, if the greatest one among M2, M3, M4, M5 and M6 is M3, 'M1-M3V1' shows that the first processing region 241 designated by the user is excessively large as compared with the area actually needed for processing the text, the display apparatus 100 readjusts the first processing region 241 into the second processing region 242 satisfying 'M1−M3<V1'.

The display apparatus 100 sets up a processing region corresponding to the coordinates and area of the second processing region 242 instead of the first processing region 241, with respect to all the subsequent video frames 240, and applies the OCR process to each setup processing region.

There may be various methods of determining the area occupied with the text within the processing region. As one example, the area occupied with the text may be determined based on the number of text lines within each sampled processing region. Under the conditions that the first processing region 241 is designated to correspond to five lines and V1 is set up as 1.5, a case where M3 greatest among M2, M3, M4, M5 and M6 is 4 and a case where M3 is 3 will be described below.

If M3 is 4, 'M1−M3' is 1 and thus smaller than 1.5, 'M1−M3<V1' is satisfied. This scenario shows that the first processing region 241 is set up to have an appropriate area, and therefore the display apparatus 100 does not have to adjust the first processing region 241.

On the other hand, if M3 is 3, 'M1−M3' is 2 and thus greater than 1.5, 'M1−M3V1' is satisfied. This scenario shows that the first processing region 241 is set up to have an excessively large area, and therefore the display apparatus 100 reduces the first processing region 241 until it satisfies 'M1−M3<V1'. For example, the display apparatus 100 may change the designation of the first processing region 241 again from five lines to four lines.

If the greatest one among M2, M3, M4, M5 and M6 is greater than M1, the first processing region 241 is set up to be smaller than an actually required region. In this case, contents of a subtitle are not normally displayed within the video frame 240. Therefore, a user recognizes that the contents of the subtitle are not normally displayed within the video frame 240, and the user sets up the first processing region 241 again through a method similar to the foregoing first exemplary embodiment.

As shown in the first exemplary embodiment, translations of texts extracted from the video frames according to respective points of time has to be synchronized with the respective video frames and then displayed on the video frame from which an original text is extracted. This will be described below.

Figure 6:
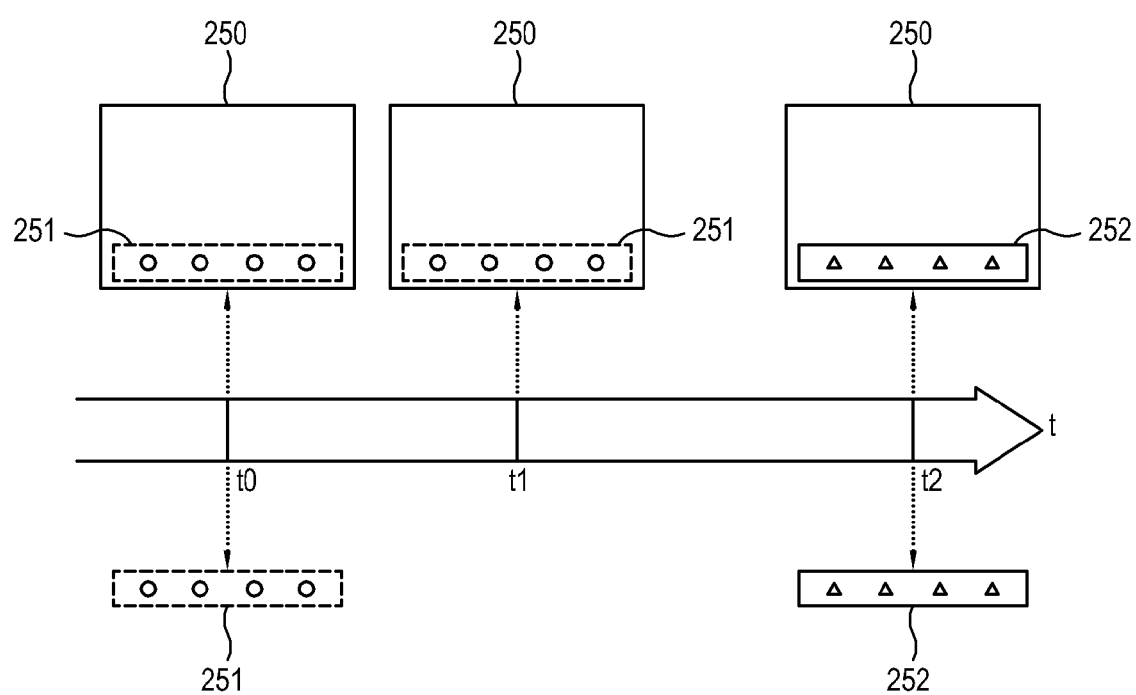
FIG. 6 shows a concept of displaying a translation of a text extracted from a predetermined video frame in sync with the corresponding video frame according to a third exemplary embodiment.

FIG. 6 shows a concept of displaying a translation 252 of a text extracted from a predetermined video frame 250 in sync with the corresponding video frame 250 according to a third exemplary embodiment.

As shown in FIG. 6, the display apparatus 100 extracts a processing region 251 from a video frame 250 at a point of time t0. The method of setting up the processing region 251 from the video frame 250 and extracting a text from processing region 251 may be based on the foregoing exemplary embodiments. Thus, detailed descriptions thereof will be omitted.

The video frame 250 temporarily stored in the buffer (refer to buffer 160 in FIG. 1) at the point of time t0 is processed by the processor (refer to processor 120 in FIG. 1) and displayed on the display (refer to display 130 in FIG. 1) at a point of time t1 as long as specific control is not performed by the controller 170.

The display apparatus 100 extracts the text from the processing region 251 by applying the OCR process to the processing region 251 extracted from the video frame 250 at the point of time t0, and requests the server (refer to server 10 in FIG. 1) to translate the text. Since time is taken in extracting and translating the text, a final translation 252 for the processing region 251 at the point of time t0 is displayable at the point of time t2.

However, the time taken in the process makes the point of time t2 not be the point of time t1, but the subsequent point of time. If the display apparatus 100 displays the translation 252 at the point of time t2, a problem arises in that the video frame 250 is not corresponding to the original text, but another video frame after the point of time for the original video frame 250 is overlaid with the translation 252.

Thus, the display apparatus 100 solves the foregoing problem by the following method. The display apparatus 100 tabulates a time table with a value of the point of time t0 for extracting the processing region 251, and a text extracted from the processing region 251. Further, the display apparatus 100 calculates a time to be taken in extracting the text from the processing region 251 and completely translating the text. Then, the display apparatus 100 compensates t0 of the time table with this calculated time so that the point of time for displaying the translation 252 can be coincident with the point of time for displaying the video frame 250. The display apparatus 100 displays the video frame 250 and the translation 252 based on the compensated time table.

In other words, the display apparatus 100 delays the display of the video frame 250 as much as the time taken in extracting the text from the processing region 251 of the video frame 250 and translating the corresponding text, thereby displaying the video frame 250.

Thus, the display apparatus 100 can display the translation 252 of the text extracted from the video frame 250 in sync with the corresponding video frame 250.

In terms of successively applying the OCR process to respective processing regions, different contents may be extracted from the text due to an error in the OCR process even though the contents are actually the same, which will be described below.

Figure 7:
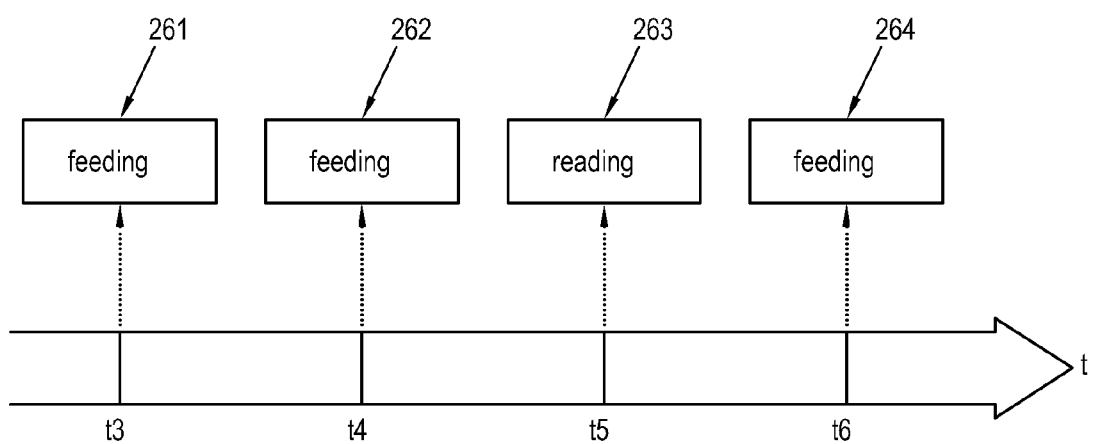
FIG. 7 shows an extracted state of a text sampled by a predetermined number of times according to a fourth exemplary embodiment.

FIG. 7 shows an extracted state of a text 261, 262, 263, 264 sampled by a predetermined number of times according to a fourth exemplary embodiment. In this exemplary embodiment, a word will be described for simplicity, but not limited thereto. Alternatively, a unit of sentence may be applied to this exemplary embodiment.

As shown in FIG. 7, the display apparatus 100 samples the texts 261, 262, 263, and 264 extracted from the video frames sequenced in time by a predetermined number of times. Let successive points of time be t3, t4, t5 and t6, respectively. Further, let the texts extracted from the video frames at the respective points of time be a first text 261, a second text 262, a third text 263 and a fourth text 264, respectively.

For example, the contents of the first text 261, the second text 262, and the fourth text 264 correspond to a word "feeding", and the content of the third text 263 corresponds to a word "reading". In this case, the contents of the second text 262 and the fourth text 264 before and after the point of time for the third text 263 are the same. Therefore, the display apparatus 100 determines that the third text 263 is not actually different in contents from the first text 261, the second text 262 and the fourth text 264 and an error occurs in the OCR process. Thus, the display apparatus 100 determines the extracted third text 263 as dummy data and ignores the content of the third text 263, thereby processing the third text 263 to have the same contents as the second text 262.

In other words, the display apparatus 100 samples the texts extracted from the video frames sequenced in time by a preset number of times, and compares the text of the third video frame corresponding to the subsequent point of time with the text of the first video frame if the text of the second video frame is different in contents from that of first video frame corresponding to the previous point of time. As a result of comparison, if the text of the first video frame has the same contents as the text of the third video frame, the display apparatus 100 determines that the OCR error occurs while extracting the text from the second video frame, and determines that the text of the second video frame has the same contents as the texts of the first video frame or the third video frame.

Accordingly, the display apparatus 100 can compensate for an error in the OCR process, which may occur while extracting the successive texts.

Meanwhile, the foregoing exemplary embodiments describe the translation service as an example of the preset process for the text extracted from the video frame. However, the service for processing the extracted text is not limited to the translation. Alternatively, various service environments may be offered to a user as long as it can be realized in the display apparatus 100.

Figure 8:
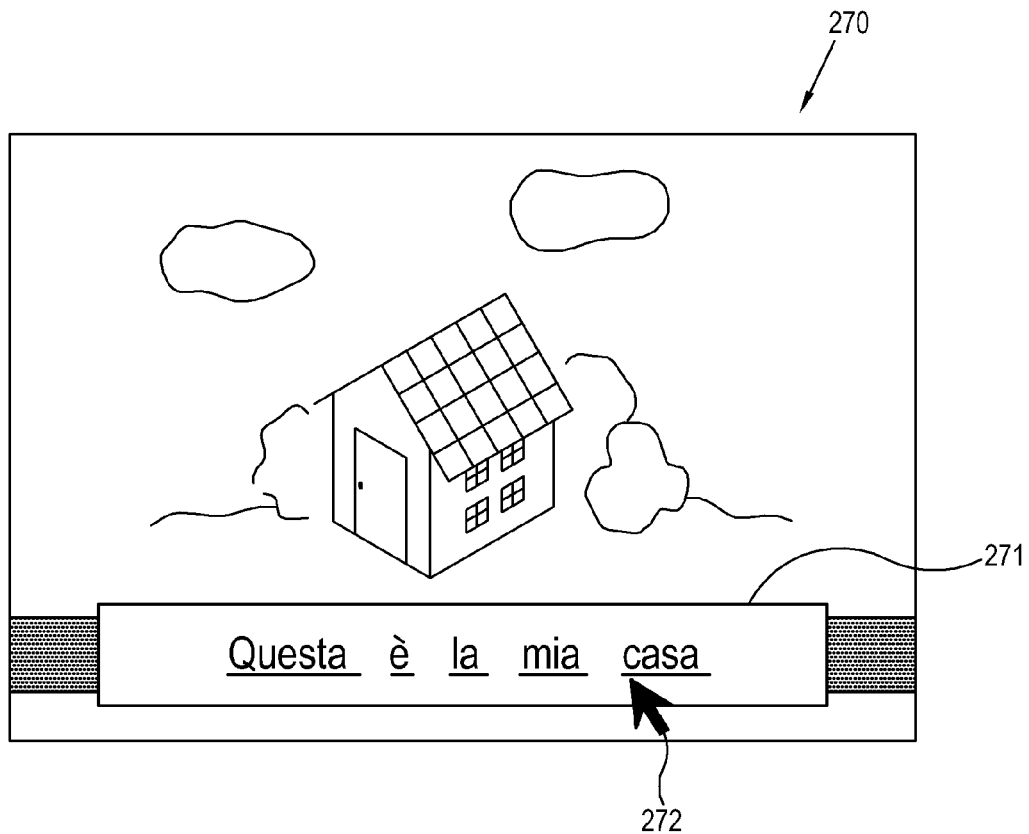
FIG. 8 shows an example where a video frame is overlaid with a text according to a fifth exemplary embodiment.

FIG. 8 shows an example where a video frame 270 is overlaid with a text 271 according to a fifth exemplary embodiment.

As shown in FIG. 8, the display apparatus 100 extracts the text 271 from the video frame 270, and displays the video frame 270 to be overlaid with the extracted text 271. The display apparatus 100 allows each text 271 to be selected by a cursor 272.

A user moves the cursor 272 to a word of each text 271 and selects it. If a user selects one among the words of the text 271, the display apparatus 100 may pop up the meaning and explanation of the selected word, and output the pronunciation of the corresponding word. To this end, the display apparatus 100 may be internally provided with a dictionary database of words, or may access the server (not shown) that offers a search service for this database.

The display apparatus 100 may reflect various services on the text extracted from the video frame, and provide it to a user.

A method of controlling the display apparatus 100 will be described.

Figure 9:
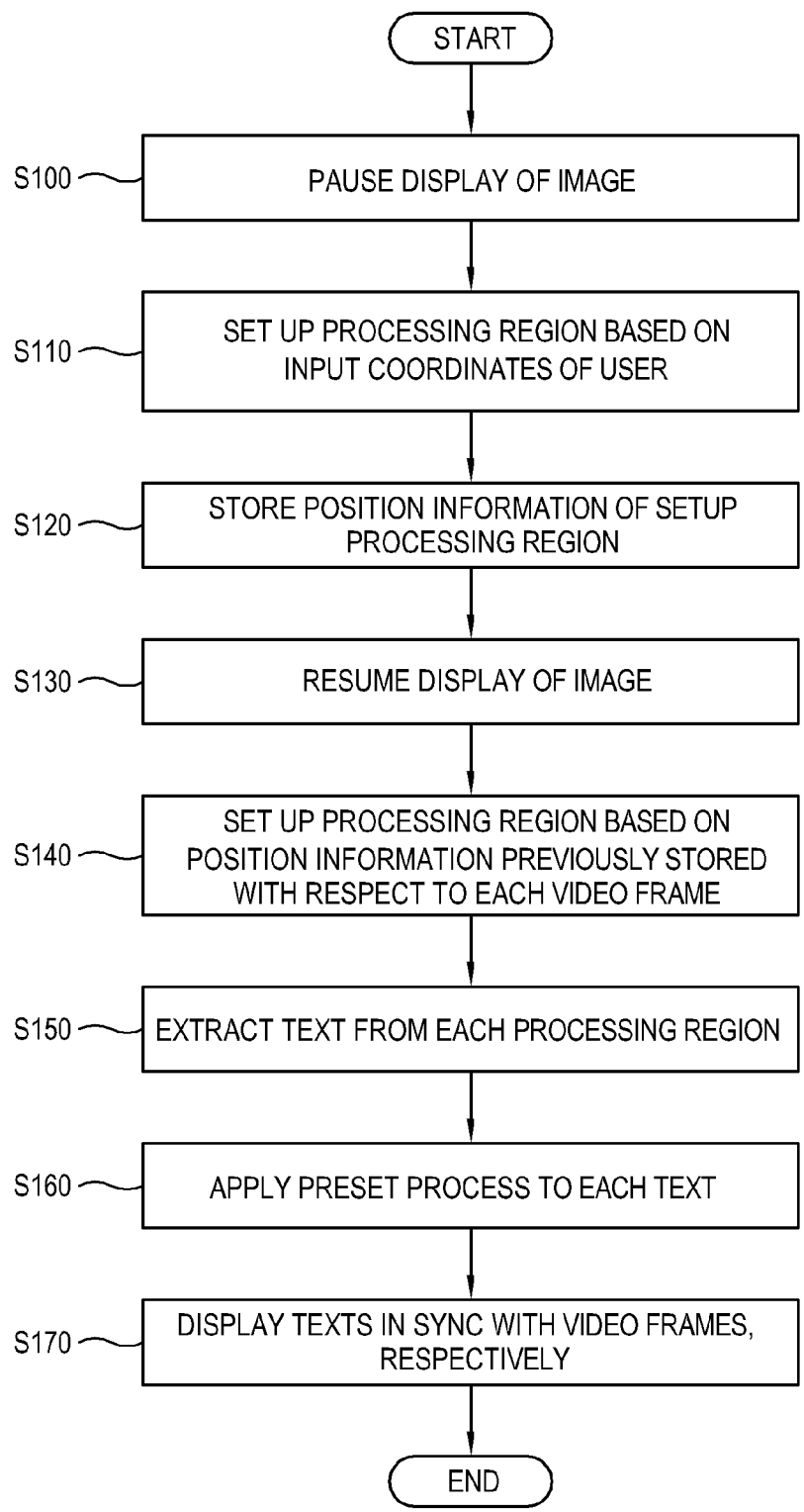
FIG. 9 is a flowchart showing a method of controlling a display apparatus according to a sixth exemplary embodiment.

FIG. 9 is a flowchart showing a method of controlling a display apparatus according to a sixth exemplary embodiment.

As shown in FIG. 9, at operation 5100, the display apparatus 100 pauses display of an image if an event occurs for designating the processing region. At operation 5110, the display apparatus 100 sets up the processing region in the video frame based on coordinates input by a user. At operation S120, the display apparatus 100 stores position information of the setup processing region.

At operation 5130, the display apparatus 100 resumes the display of the image. At operation 5140, the display apparatus 100 sets up the processing region in accordance with the position information previously stored for the respective video frames to be displayed. At operation 5150, the display apparatus 100 extracts the text with respect to the respectively setup processing region. At operation 5160, the display apparatus 100 applies the preset process to the text.

At operation 5170, the display apparatus 100 displays the processed texts in sync with the video frames, respectively.

Figure 10:
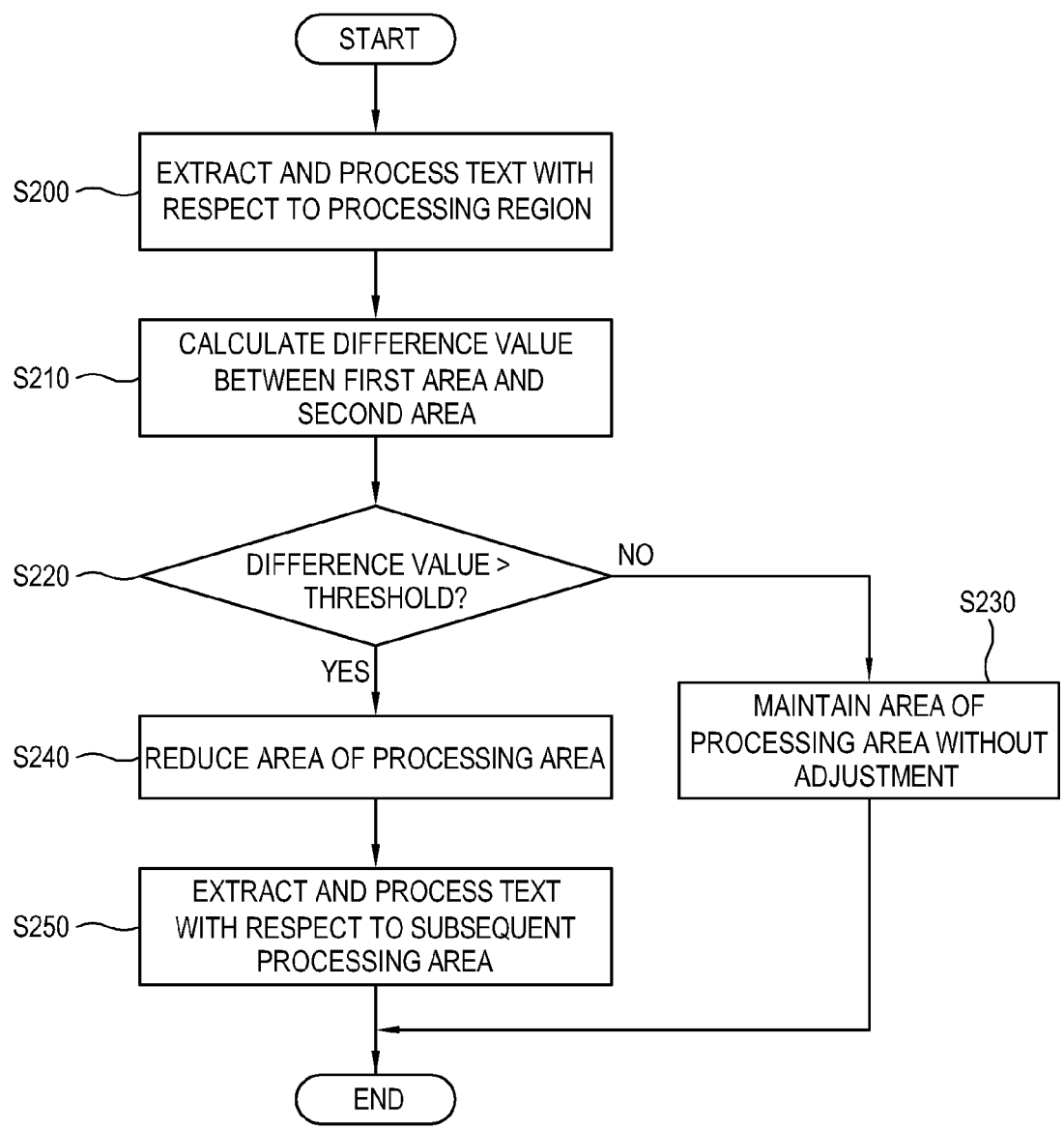
FIG. 10 is a flowchart showing a method of controlling a display apparatus according to a seventh exemplary embodiment.

FIG. 10 is a flowchart showing a method of controlling a display apparatus according to a seventh exemplary embodiment. In this exemplary embodiment, an initial state refers to a state that the processing region is set up in accordance with the foregoing method shown in FIG. 9.

As shown in FIG. 10, at operation 5200, the display apparatus 100 extracts and processes the text with respect to the setup processing region.

At operation 5210, the display apparatus 100 calculates a difference value between the first area of the processing region designated at first by a user and the second area occupied with the text within the processing region of the next video frame.

At operation 5220, the display apparatus 100 determines whether the calculated difference value is greater than a preset threshold.

If the calculated difference value is not greater than the threshold, at operation 5230 the display apparatus 100 does not adjust but maintains the processing region as it is.

On the other hand, if the calculated difference value is greater than the threshold, at operation 5240 the display apparatus 100 reduces the area of the processing region so that the difference value can be smaller than the threshold.

Further, at operation 5250, the display apparatus 100 extracts and processes the texts with respect to the respective processing regions of the following video frames.

Although a few exemplary embodiments have been shown and described, it will be appreciated by those skilled in the art that changes may be made in these exemplary embodiments without departing from the principles and spirit of the exemplary embodiments, the scope of which is defined in the appended claims and their equivalents.

What is claimed is:

1. An apparatus comprising:
a receiver configured to receive a video signal;
an image processor configured to process the video signal;
a display comprising a touch screen configured to display an image comprising a text region based on the processed video signal and to receive a user input of a user, the image including a series of frames; and
a controller comprising a central processor configured:
to receive the user input of the user to designate a region on one frame among the series of frames in the image through the touch screen, and
to extract a text from the designated region on the one frame,
wherein the controller is further configured to extract texts from designated regions on the frames which are consecutive, respectively, if one text among the extracted texts is different from others, to correct the one text to be the same as the others.

2. The apparatus according to claim 1, wherein the controller is further configured to control the image processor to apply optical character recognition (OCR) to the designated region and extract a plurality of texts from the designated region.

3. The apparatus according to claim 1, further comprising a motion sensor configured to sense a user motion, and
the controller is further configured to designate the region in accordance with the sensed user motion by the motion sensor.

4. The apparatus according to claim 1, wherein the user input of the user comprises a cursor movement.

5. The apparatus according to claim 1, wherein the controller is further configured to transmit the extracted text to a server, to receive and display a translation of the text from the server.

6. The apparatus according to claim 5, wherein the controller is further configured to display the designated region to be overlaid with the translation in response to the translation being displayed.

7. A method of controlling a display apparatus comprising a display, the method comprising:
receiving a video signal;
processing the video signal;
displaying the processed video signal as an image comprising a text region on a touch screen of the display, the image including a series of frames;
receiving a user input of a user for designating a region on one frame among the series of frames in the image through the touch screen; and
extracting a text from the designated region on the one frame,
wherein the extracting the text from the designated region comprises:
extracting texts from designated regions on the frames which are consecutive, respectively, and
if one text among the extracted texts is different from others, correcting the one text to be the same as the others.

8. The method according to claim 7, wherein the extracting the text from the designated region comprises applying optical character recognition (OCR) to the designated region and extracting a plurality of texts from the designated region.

9. The method according to claim 7, wherein the receiving the user input of the user for designating the region comprises designating the region in accordance with a sensed user motion sensed by a motion sensor of the display apparatus.

10. The method according to claim 7, wherein the receiving the user input of the user for designating the region comprises designating the region in accordance with a cursor movement through the touch screen of the display apparatus.

11. The method according to claim 7, further comprising transmitting the extracted text to a server; and
receiving and displaying a translation of the text from the server.

12. The method according to claim 11, wherein the receiving and displaying the translation of the text from the server comprises displaying the designated region to be overlaid with the translation.

\* \* \* \* \*